United States Patent [19]
Warner et al.

[11] Patent Number: 5,228,081
[45] Date of Patent: Jul. 13, 1993

[54] RINGING SIGNAL CONTROL CIRCUIT FOR AN ENHANCED SUBSCRIBER LINE INTERFACE

[75] Inventors: Michael Warner; Chris Pawlowski, both of Phoenix, Ariz.

[73] Assignee: AG Communication Systems Corporation, Phoenix, Ariz.

[21] Appl. No.: 599,534

[22] Filed: Oct. 18, 1990

[51] Int. Cl.⁵ .............................................. H04M 1/00
[52] U.S. Cl. .................................. 379/399; 379/373; 379/345; 379/377
[58] Field of Search ............... 379/345, 398, 399, 402, 379/403, 404, 405, 387, 372, 373, 377, 382, 412, 413, 251, 252, 253

[56] References Cited

U.S. PATENT DOCUMENTS

| | | | |
|---|---|---|---|
| 4,536,618 | 8/1985 | Serrano | 379/372 |
| 4,686,702 | 8/1987 | Kizaki | 379/373 |
| 4,939,775 | 7/1990 | Houck et al. | 379/373 |
| 4,984,266 | 1/1991 | Smith | 379/399 |

*Primary Examiner*—James L. Dwyer
*Assistant Examiner*—M. Shehata
*Attorney, Agent, or Firm*—Gregory G. Hendricks

[57] ABSTRACT

A ringing signal control circuit used in a Subscriber Line Interface Circuit (SLIC) for connecting a ringing signal bus to a subscriber loop. The ringing signal bus transmits ringing signals along the subscriber loop to a subscriber instrument. The SLIC includes a High Voltage Line Interface (HVLI) circuit connected to the subscriber loop and the ringing signal bus is connected to a ringing generator that provides a source of ringing signals. The ringing signal control circuit comprises a logic interface circuit connected via an address/data bus to a central controller that is arranged to receive ringing connection signals from the central controller and to generate a ringing activation signal. A ring timing circuit receives the ringing activation signal and generates a first and second output signals. The second output signal is transmitted from the ring timing circuit at a specific time interval subsequent to the first output signal. A first switching device receives the first output signal from the ring timing circuit and disconnects the HVLI from the subscriber loop. A second switching device receives the second output signal from the ring timing circuit, connecting the ring bus and the ringing signals to the subscriber loop for transmission to the subscriber instrument.

11 Claims, 5 Drawing Sheets

RINGING SIGNAL CONTROL CIRCUIT FOR AN ENHANCED SUBSCRIBER LINE INTERFACE

CROSS-REFERENCE TO RELATED APPLICATIONS

Cross reference is made to the following related Application entitled: "An Enhanced Subscriber Line Interface Circuit", Ser. No. 07/817,709 filed Jan. 7, 1992; "An Enhanced High Line Interface Circuit", Ser. No. 07/599,537 filed Oct. 18, 1990; "A Hybrid Balance And Combination Codec Filter Circuit", Ser. No. 07/599,533 filed Oct. 18, 1990; and "An Over-Current Detector Circuit For An Enhanced Subscriber Line Interface", Ser. No. 07/599,536 filed Oct. 18, 1990, filed on the same date as the instant Application, and having a common assignee.

BACKGROUND OF THE INVENTION

1. Field of the Invention

The present invention relates in general to the field of telecommunications, and more particularly, to a control circuit used in an enhanced Subscriber Line Interface Circuit (SLIC) for applying and removing ringing signals to a subscriber loop.

2. Description of the Prior Art

Subscriber line interface circuits are customarily found in the central office exchange of a telecommunications network. The SLIC weds the digital switching network of the central office exchange to a plurality of analog subscriber lines. The analog subscriber lines connect to subscriber stations or telephone instruments found at subscriber locations remote from the central office exchange.

The SLIC functions to supply power to a subscriber station and to transmit and receive voice signals between the digital switching network and the subscriber station.

Modern solid state SLICs are constructed using specialized integrated circuits. This construction dispenses with the need for inductive components in the analog end of the interface. The operating environment of the SLIC includes a necessity to provide high voltages and currents, used for analog voice transmission and substation signalling, as well as, low voltage digital logic signals used for the transmission of digital data between the SLIC and the digital switching network. The high voltage requirements of −48 V battery feed is accomplished using a specialized High Voltage Subscriber Line Interface Circuit (HVSLIC). Such as the HVSLIC circuit described in patent application Ser. No. 445,516, filed Dec. 4, 1989, entitled "High Voltage Subscriber Line Interface Circuit", having a common assignee with the present invention.

The translation of the analog voice signals to PCM encoded digital signals and the interface of the PCM digital signals between the line circuit and the digital switching system is accomplished using a specialized integrated circuit known as a CODEC/FILTER. The CODEC/FILTER converts analog voice signals received from a subscriber line and the HVSLIC to PCM encoded digital signals. Similarly, PCM encoded digital signals from the digital switching system are converted into analog voice signals for transmission on the subscriber line. One such device is the commercially available as the CODEC/FILTER COMBO TM, TP30XX family of COMBO TM devices manufactured by the National Semiconductor Company.

The SLIC must also provide certain signalling and detection functions in order to allow the digital switching system to communicate with a subscriber station. These signaling and detection functions include ringing signal control, ring-trip and loop sense detection as well as detection of abnormal loop conditions.

These functions are normally provided by a low voltage companion circuit of the HVSLIC usually referred to as a Low Voltage Subscriber Line Interface Circuit (LVSLIC). One such LVSLIC circuit is described in U.S. Pat. Application Ser. No. 445,826, filed Dec. 4, 1989, entitled "Control Circuit For A Solid State Telephone Line Circuit", having a common assignee with the present invention. The LVSLIC communicates via a data and address bus with a central controller of the digital switching system. Information pertaining to the status of the SLIC and the subscriber line are transmitted from the LVSLIC to the central controller. Operating commands from the central controller are received by the LVSLIC for execution by the SLIC.

One of the functions provided by a LVSLIC is the application and deactivation of ringing signals to the subscriber loop. The LVSLIC under software control applies the ringing current to the subscriber loop from a ringing current generator and then waits for the subscriber instrument to go "off-hook". A detected "off-hook" or ring trip condition signifies that the subscriber has picked up the receiver and therefore the application of ringing current must cease. Such a ringing control circuit is described in U.S. Pat. Application Ser. No. 445,820, filed Dec. 4, 1989, titled "A Ring Trip Detector For A Solid State Telephone Line Circuit", having a common assignee with the present invention.

Presently known ringing control circuits suffer from false "off-hook" detection due to noise spikes induced onto the subscriber loop from external environmental sources. The induced noise is detected by the LVSLIC ring detector as an "off-hook" condition and the ringing terminated prematurely.

Further, many presently known ringing signal systems use relays to couple the ringing current into the subscriber loop. The metal contact closure of a relay bounces and chatters for several milliseconds after activation. This induces impulse noise into the adjacent subscriber loops which can degrade the quality of the audio path.

Therefore, it is advantageous to provide a ringing signal control system that can discriminate between an actual ring trip and noise pulses and also eliminates impulse noise from relay contact closure.

Presently available SLICs conform to a circuit architecture that connects in combination an integrated circuit HVSLIC, an LVSLIC, and CODEC/FILTER with discrete components that provide subscriber line configuration and protection. This SLIC combination connects a single subscriber line to the central office exchange.

Such a SLIC is described in U.S. Pat. Application Ser. No. 445,517, filed Dec. 4, 1989, entitled "A Solid State Telephone Line Circuit", having a common assignee with the present invention.

The SLIC just described is normally one circuit of a plurality of SLICs that are assembled on a line card. The line card connects a plurality of subscriber lines to the digital switching network. Typically, eight or more SLICs can be found on a single line card. However, each SLIC is susceptible to catastrophic damage due to the environment of the associated subscriber line, such as lightning strikes, power surges, etc. A failure of one SLIC circuit necessitates the replacement of the line card. It is advantageous therefore to be able to replace only those circuits of the line card that are damaged by the aforementioned environmental factors and not the entire line card.

Further, since the LVSLIC acts primarily as a local controller and signal detector between the central controller of the digital switching system and the HVSLIC and COMBO, a certain amount of economy in circuit components can be realized by removing the LVSLIC from the above mentioned combination. By placing the LVSLIC in a more central location the LVSLIC can provide control and detection functions to two or more HVSLIC and COMBO circuits. The central location also isolates the digital control from the high voltage associated with the HVSLIC.

Accordingly, it is an object of the present invention to provide a new and effective ringing signal control circuit for an enhanced subscriber line interface for applying and removing ringing current to a subscriber loop.

SUMMARY OF THE INVENTION

The above and other objects, advantages, and capabilities are realized in a ringing signal control circuit used in a Subscriber Line Interface Circuit (SLIC) for connecting a ringing signal bus to a subscriber loop. The ringing signal bus transmits ringing signals along the subscriber loop to a subscriber instrument. The SLIC includes a High Voltage Line Interface (HVLI) circuit connected to the subscriber loop. The ringing signal bus is connected to a ringing generator that provides a source of ringing signals.

The ringing signal control circuit of the present invention comprises a logic interface circuit connected via an address/data bus to a central controller. The logic interface circuit is arranged to receive ringing connection signals from the central controller.

A ringing register connected to the logic interface circuit is arranged to be selectively operated by the central controller to capture and store the ringing connection signals and to generate a ringing activation signal.

A ring timing circuit connected to the ringing register receives the ringing activation signal and generates a first output signal and a second output signal. The second output signal is transmitted from the ring timing circuit at a specific time interval subsequent to the first output signal.

A ring relay is connected to the ring bus and to the subscriber loop. The ring relay receives the first output signal from the ring timing circuit whereby it is activated disconnecting the HVLI circuit from the subscriber loop.

A solid state switching device connected to the ring bus receives the second output signal from the ring timing circuit. In response to the second output signal the solid state switching device is activated, connecting the ring bus and the ringing signals to the subscriber loop for transmission to the subscriber instrument.

The ringing signal control circuit is further arranged to disconnect the ringing signal bus from the subscriber loop. The HVLI circuit includes circuits for sensing that the subscriber instrument has gone "off-hook" and that a ring trip has occurred. When a ring trip is detected the HVLI transmits a ring trip signal to the ring timing circuit. The ring timing circuit then turns-off the second output signal, deactivating the solid state switching device and disconnecting the ring bus from the subscriber loop.

At a specific time period subsequent to turning-off the second output signal the ring timing circuit turns-off the first output signal, deactivating the ring relay and reconnecting the HVLI circuit to the subscriber loop.

BRIEF DESCRIPTION OF THE DRAWINGS

A better understanding of the invention may be had from the consideration of the following detailed description taken in conjunction with the accompanying drawings in which.

DESCRIPTION OF A PREFERRED EMBODIMENT

Figure 1:
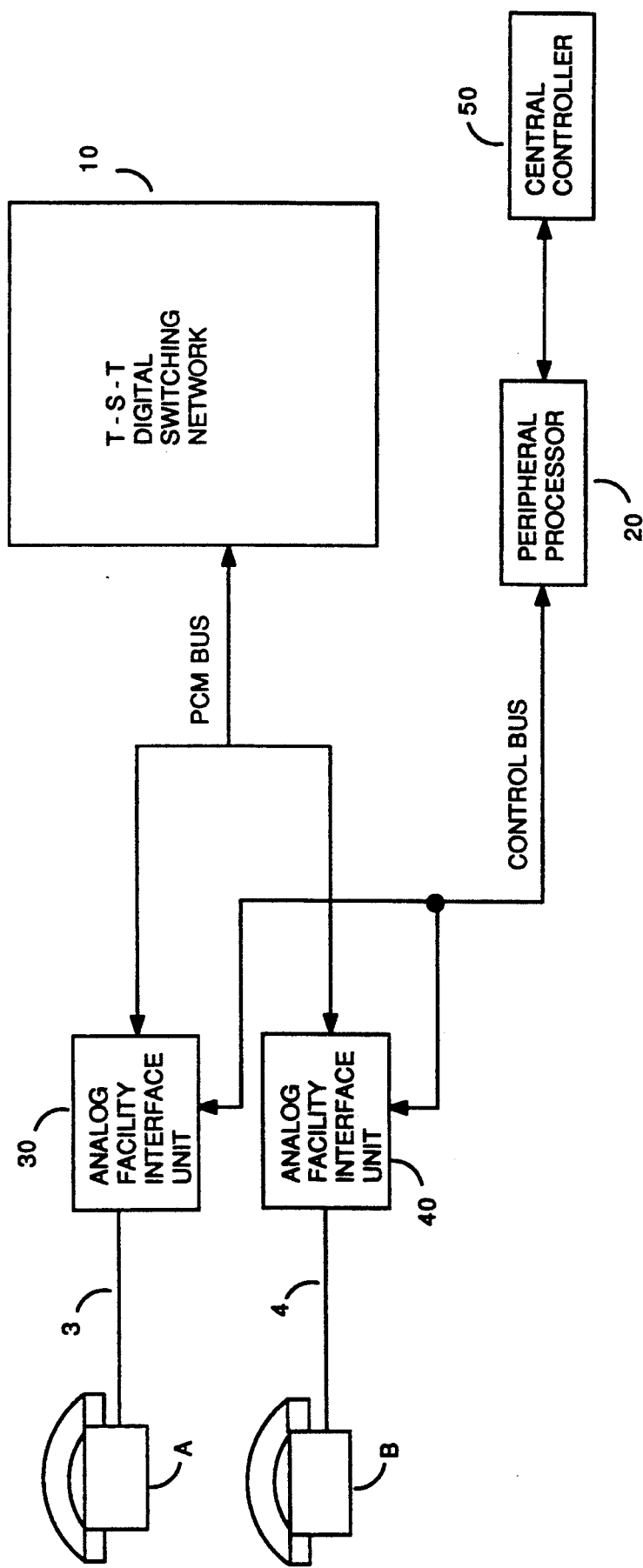
FIG. 1 is a simplified block diagram of a T-S-T central office switching system where the enhanced SLIC in accordance with the present invention is used to advantage.

Turning now to FIG. 1 of the included drawings a central office switching system or central office exchange of the type to which the invention is used to advantage is illustrated. The central office switching system includes a time division multiplexed Time-Space-Time (T-S-T) digital switching network 10 consisting minimally of an originating time switch and control unit, a space switch unit and a terminating time and control unit (not shown). The T-S-T network 10, connects to Analog Facility Interface Units (AFIU) 30 and 40 via a (Pulse Code Modulation) PCM BUS. Each AFIU 30 and 40 allows, in this embodiment, the connection of subscriber lines 3 and 4 respectively to the network 10. Subscriber lines 3 and 4 further connect to subscriber telephone instruments A and B, respectively. The network 10 and each AFIU 30 and 40 is further connected to a Peripheral Processor (PP) 20, via a CONTROL BUS. The PP 20 maintains control of its environment by scanning the AFIUs 30 and 40 and controlling the associated network time and control units. The total control of the network connections within the network 10 is the responsibility of the Central Controller (CC) 50. That is, the central controller 50, via the PP 20, informs the time and control units of the time switch connections and also informs the space switch unit of the space switch connections. In addition the CC 50 maintains a data base of the call processing and administrative software for the central office switching system.

Analog voice signals from the transmitter of subscriber instrument A are transmitted to AFIU 30 where they are converted to PCM encoded digital signals. The PCM encoded digital signals are then inserted into available channels on the PCM BUS and transmitted to the digital switching network 10. Under control of the PP 20 the PCM encoded digital signals from subscriber A are switched through the digital switching network 10 and transmitted to AFIU 40 on the PCM BUS. The received PCM encoded digital signals are converted back to analog voice signals and transmitted via subscriber line 4 to the receiver of subscriber instrument B. The SLIC of the present invention is located within the AFIU.

Figure 2:
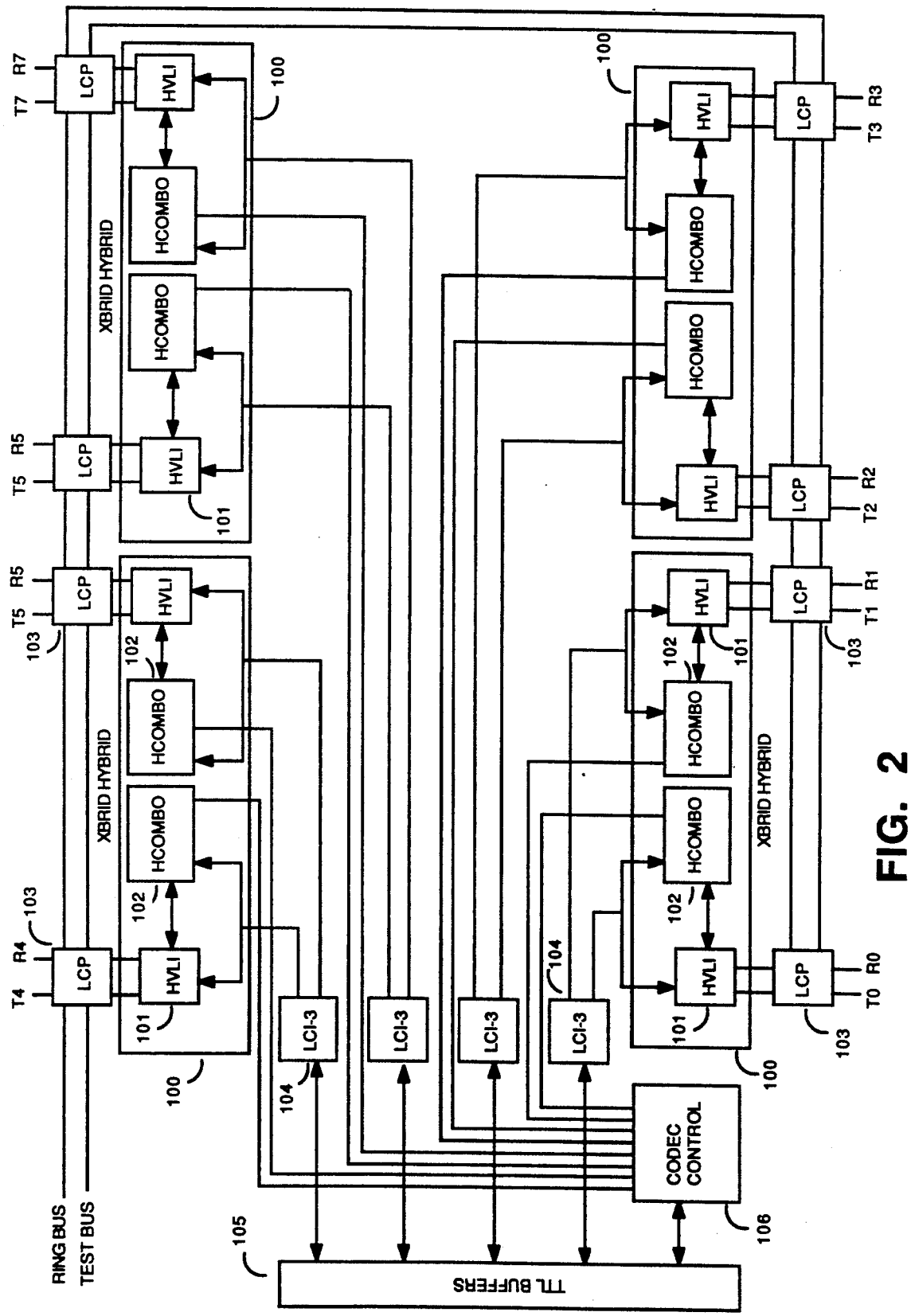
FIG. 2 is a block diagram of a line card including the enhanced SLIC in accordance with the present invention.

Turning now to FIG. 2 of the included drawings a block diagram of a line card including the enhanced SLIC is shown. The line card shown in FIG. 2 includes eight SLICs. Each SLIC is arranged to interface a single subscriber line comprised of a Tip (T) lead and Ring (R) lead to the T-S-T digital switching network 10. The line card includes four thick-film transmission hybrid (XBRID) modules 100. All critical analog components of the SLIC are contained on the XBRID module 100. Each XBRID module 100 further includes two High Voltage Line Interface (HVLI) circuits such as HVLI 11 and two Hybrid Combo (HCOMBO) circuits such as HCOMBO 102 along with matched resistor networks and battery feed transistors (not shown). An HVLI 101 and a HCOMBO 102 form one functional SLIC that in combination provide most of the so-called BORSCHT-functions. In particular, the function of the subscriber power supply (Battery), line status monitoring (Signals, Supervision), analog-digital conversion (Coding) and filter functions and two wire-four wire transition (Hybrid) are provide by the HVLI 101 and HCOMBO 102 of each XBRID module 100.

In addition to powering the subscriber line, the HVLI 101 performs the essential two wire-four wire hybrid function of splitting the balanced signal on the T and R leads to separate transmit/receive paths. The differential audio signals are transmitted and received to/from the HCOMBO 102. The HVLI 101 further performs loop supervision, ring trip detection, ground sensing and over-current detection. A more detailed explanation of the electrical structure and operation of HVLI 101 may be had by reference to co-pending U.S. Patent Application Ser. No. 07/599,537 filed Oct. 18, 1990.

The HCOMBBO 102 synthesizes the input impedance of the SLIC and performs hybrid balance echo cancelation. Additionally, the HCOMBO 102 converts the differential audio signals from the HVLI 101 to PCM encoded digital signals and from PCM encoded digital signals to differential audio signals. A more detailed explanation of the electrical structure and operation of HCOMBO 102 may be had by reference to co-pending U.S. Pat. Application Ser. No. 07/599,533 filed Oct. 18, 1990.

The remainder of the BORSCHT functions are provided by the Line Configuration and Protection (Tp) circuit 103, located off the XBRID module 100. The LCP 103 appears between the T and R leads of a subscriber line and the HVLI 101. The LCP 103 functions to provide overvoltage protection (Overvoltage), the application of ringing current to the subscriber line (Ringing) and testing of the subscriber line as well as the SLIC (Test). The LCP 103 contains ring relays which under software control inject ringing current from a ringing generator (not shown) to the subscriber line. Similarly the subscriber line as well as the SLIC can be isolated and tested via a test relay (not shown) that provides facility test (Out Test) and circuit test (In Test). The test relay allows the application of test signals from a test program which resides in the CC 50.

In a digital common logic area of the line card resides a plurality of Line Control Interface (LCI) circuits 104. Each LCI 104 performs all of the control and sense logic functions for the two SLICs of an associated XBRID module 100. In particular, each LCI 104 functions to administer and control the ringing and test relays, hook status reporting, dial pulse detection, ring trip, ground sensing, and over-current detection. Each LCI 104 connects its associated XBRID module 100 to PP 20 via a control and sense bus.

Digital logic buffers 105 transmit data from the HCOMBO 101 of XBRID module 100, to the PCM bus of the network, and conversely, receive PCM data from the network PCM bus to a respective HCOMBO 102. CODEC Control circuit 106 is an octal Time Slot Assigner Circuit (TSAC) device that functions to generate transmit and receive frame sync pulses to its connected HCOMBO devices 102. One TSA 106 connects to all eight HCOMBOs of the line card. It provides a required 1.544 MHz clock with a nominal 50% duty cycle for the purpose of shifting PCM data in and out of the HCOMBO 102 data registers. A frame (125 µsec) provides for 24 eight bit PCM channels with one framing bit for synchronization. One such TSAC device is the TP3155 Time Slot Assigner Circuit manufactured by the National Semiconductor Corporation.

As can be seen in FIG. 2, the four XBRID modules 100 on the line card, include eight SLIC circuits that via each SLICs associated LCP 103 connect to eight subscriber lines. Further, each of the four LCI 104 circuits is connected via a control and sense bus to an associated XBRID module 100 and the HVLI 101 and HCOMBO 102 pair. Still further, a single CODEC controller 106 connects to all eight HCOMBO devices 102 via a PCM and CODEC data bus, allowing the CODEC controller 106 to control the PCM time slot allocation for each of the eight SLICs. Finally, the PCM data and control and sense data is transmitted to the digital switching network 10 via the TTL buffers 105 and the network bus.

Figure 3:
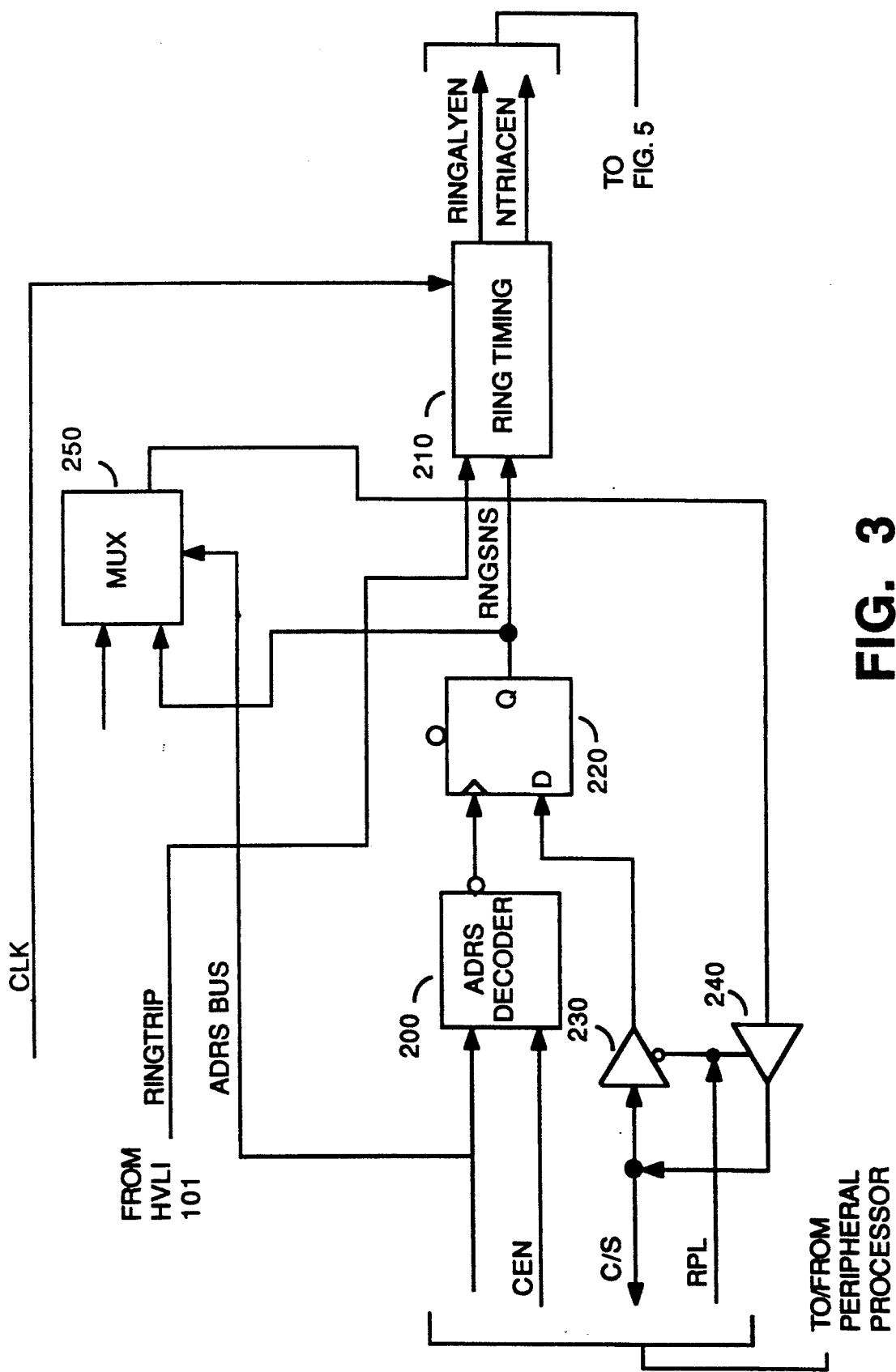
FIG. 3 is a functional block diagram of ringing signal control circuit in accordance with the present invention.

Turning now to FIG. 3, of the included drawings, one copy of the two ringing signal control circuits found within LCI 104 is shown. LCI 104 is essentially memory mapped hardware for the time switch of the T-S-T digital switching network 10. It receives asynchronous peripheral processor accesses under software control. Control and sense information are passed to and from the LCI 104 on a two bit parallel bidirectional bus. The C/S data lead conveys control and sense data to the ringing signal circuit of the present invention.

The ringing signal control circuit includes an address decoder 200 and a multiplexer 250, that are connected to a four bit address bus. Multiplexer 250 is arranged to receive the signal leads from other functional groups of the LCI 104 and only those leads associated with the present invention are shown for matters of clarity. The type of access information, that is, data that controls the LCI 104 and sense data that the peripheral processor reads from the LCI 104, is determined by the four bit address and the card enable signal CEN. For example, an address having the binary number value of 1000, with signal CEN enabled would address decoder 200 to set ringing register 220. Since the C/S data lead is bidirectional, signal RPL applied to transceivers 230 and 240 controls the direction of the information traveling on the C/S data lead. Thereby, allowing the reading of signals RINGSNS from the multiplexer 250 (sense data) by the peripheral processor.

The ringing signal control circuit further includes a ring timing circuit 210 that receives hardware ring trip signal RINGTRIP and ringing signal activation signal RINGSNS from ringing register 220. Signal RINGTRIP is developed in HVLI 101 when the subscriber instrument goes "off-hook" during a ringing cycle or a ring trip condition is sensed on the subscriber loop.

The ringing register 220 controls the activation and termination of the ringing signal function of the enhanced SLIC. Once the ringing register control point is set, a ringing relay is activated. Ring timing 210 provides circuitry that generates a signal to a triac device which is enabled approximately 20 milliseconds after the ring relay is activated, to assure that the ring relay contacts have settled. This method avoids using metal contact closure to place the ringing signals on the subscriber loop.

Ringing is removed from the line by either a hardware ring trip from HVLI 101 or by setting a software control point. In a hardware ring trip, signal RINGTRIP is applied to ring timing circuit 210. Circuit 210 then turns off the triac via signal NTRIACEN. Approximately 40 milliseconds later the ringing relay is disabled via signal RINGRLYEN. This assures that ringing current will be removed from the line at zero voltage, thereby reducing the potential for impulse noise due to relay contact bounce.

A software turn-off clears the ringing register 220. Signal RNGSNS is then removed, disabling the ring relay and triac at the same time. Impulse noise is not an important consideration in this condition since software cuts the ring bus between the enhanced SLIC and the ringing signal generator before clearing register 220.

Figure 4:
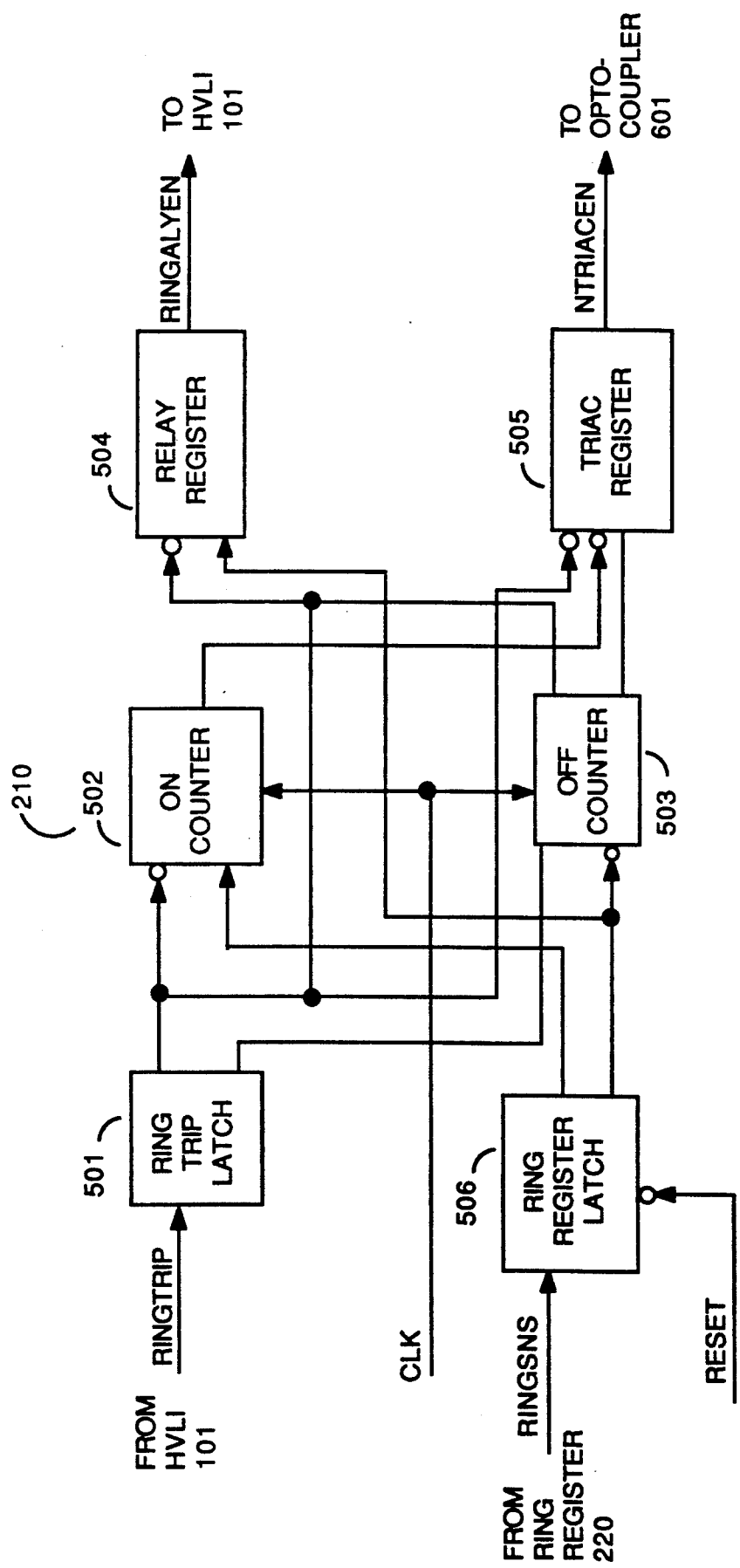
FIG. 4 is a functional block diagram of the ring timing circuit in accordance with the present invention.

Turning now to FIG. 4 of the included drawings the ring timing circuit of the present invention is shown. The ring timing circuit 210 includes a ring trip latch 501, connected to an on counter 502, an off counter 503, and a triac register 505. A ring register latch 506 is connected to on counter 502, off counter 503, and a relay register 504. The off counter 503 is connected to the relay register 504, and the triac register 505.

When software sets ring register 220 a positive logic signal RNGSNS is transmitted and stored in ring register latch 506. This immediately sets relay register 504 and holds the off counter 503 clear. Relay register 504 then outputs signal RINGRLYEN to HVLI 101. A shown in FIG. 5, signal RINGRLYEN is then output from HVLI 101, activating ring relay (RR) 600. RR 600 breaks the tip and ring leads to HVLI 101, connecting ring bus leads RRB and RRS to the subscriber loop via RR 600 contacts K4A and K4B. A complete path to the ring lead from the ringing generator is not made yet since triac 602 is still held in a non-conductive state.

On the setting of ring register latch 506, the on counter 502 is enabled and begins to count to five. With a 250 Hz clock the count takes approximately 20 milliseconds to complete. When the count of five is reached the triac register 505 is cleared. Negative logic signal NTRIACEN is then transmitted to optical coupler 601, causing optical coupler 601 to conduct. Optical coupler 601 then turns on triac 602 which finally connects ringing bus lead RRS to the ring lead of the subscriber loop, thereby, completing the connection of the ring bus to the subscriber loop.

Figure 5:
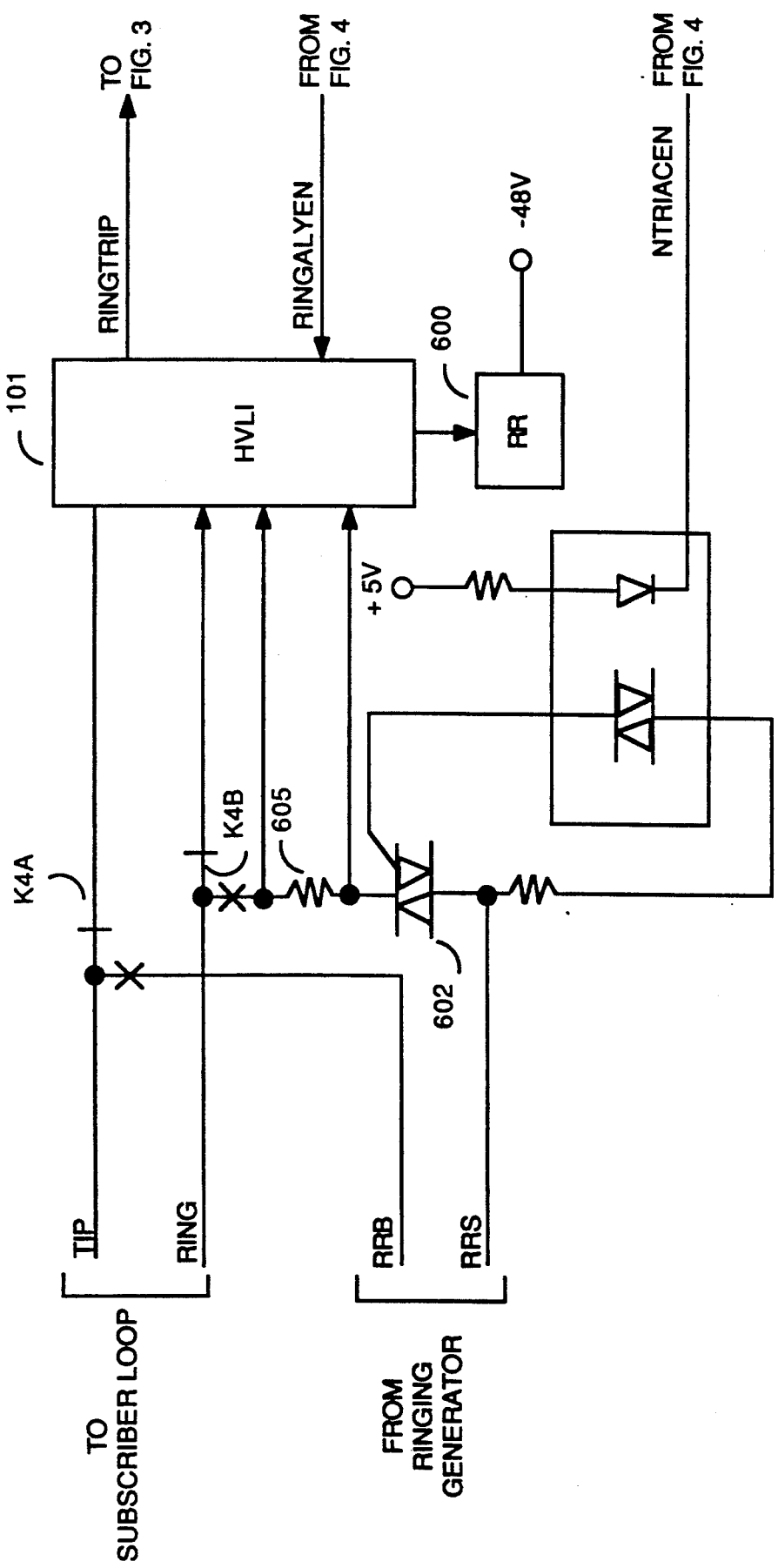
FIG. 5 is a block diagram showing the manner in which ringing current is applied and deactivated from the tip and ring leads of the subscriber loop.

With reference to FIG. 5, the manner in which the invention disables the ring relay 600, when a hardware ring trip is sensed will now be explained. When a subscriber station goes "off-hook", such as when the subscriber station handset is lifted off the station cradle, a dc circuit is formed from the ring bus lead RRB, the tip lead, the ring lead and the RRS lead of the ring bus. When this happens a dc current from the battery biased ringing generator is drawn through the subscriber loop. This hardware ring trip is detected by resistor 605, connected in series with the ring lead. Resistor 605 develops a voltage that is proportional to the applied dc current. This voltage is coupled into HVLI 101 where it is sensed, and signal RINGTRIP is developed. Signal RINGTRIP is then transmitted to ring timing circuit 210, shown on FIG. 3. Signal RINGTRIP is coupled into ring timing circuit 210 and sets ring trip latch 501. Ring trip latch 501 immediately clears triac register 505 and on counter 502. When triac register 505 clears, signal NTRIACEN becomes logic high. This turns-off optical coupler 601, which in turn turns-off triac 602, breaking the RRS lead of the ring bus. Additionally, the off counter 503 is enabled to begin counting. After a count of ten is reached (approximately 40 milliseconds) the relay register is cleared which releases RR 600, finally disconnecting the ring bus from the subscriber loop and reconnecting the subscriber loop to HVLI 101. It should be noted that ring register latch 506, is not cleared and the ring trip latch 501 remains set even though the triac 602 and the RR 600 are inactive. The ring register must be cleared by a hardware reset, that forces signal RESET low, or a software ringing termination command must be issued before the ringing function can be used again.

Software can also terminate ringing. By issuing the proper control point address to address decoder 200 data on the C/S lead is loaded into ringing register 220 to clear ringing register 220. Signal RNGSNS is then changed to a logic low signal clearing the relay register 504, the ring trip latch 501, and the triac register 505. This causes both the triac 602 and RR 600 to deactivate approximately at the same time. As mentioned earlier, impulse noise due to relay contact bounce is not of critical importance in a software ring trip since software had deactivated the ring bus between the enhanced SLIC and the ringing generator before issuing the software ring trip command.

Software can ascertain ringing signal activation and termination by addressing the multiplexer and reading the status of signal RNGSNS via the bidirectional data lead C/S.

As can be appreciated from the above description the ringing signal control circuit of the present invention effectively controls the application and deactivation of ringing signals to the subscriber loop. Additionally the use of a triac with the ring relay insures that noise pulses inherent in metal contact closure are not induced into the subscriber loop.

Furthermore, it will be obvious to those skilled in the art that numerous modifications to the present invention can be made without departing from the scope of the invention as defined by the appended claims. In this context, it should be recognized that the essence of the present invention resides in a new and effective ringing signal control circuit for an enhanced subscriber line interface.

What is claimed is:

1. A ringing signal control circuit for use in a telephone system which includes a central controller operated to provide ringing connection signals at selected times, a subscriber line interface circuit (SLIC), a ringing generator operated to provide ringing signals, a ringing signal bus connected to said ringing generator, a subscriber loop, and a subscriber instrument connected to said subscriber loop, said SLIC including said ringing signal control circuit and a High Voltage Line Interface Circuit (HVLI) connected to said subscriber loop, said ringing signal control circuit comprising:

- a logic interface circuit connected via an address-/data bus to said central controller, said logic interface circuit arranged to receive said ringing connection signals from said central controller;
- a ringing register connected to said logic interface arranged to be selectively operated by said central controller to capture and store said ringing connection signals and generate a ringing activation signal;
- ring timing circuit connected to said ringing register, said ring timing circuit receiving said ringing activation signal and generating a ring timing circuit first output signal and a ring timing circuit second output signal, said ring timing circuit second output signal transmitted from said ring timing circuit at a specific time interval subsequent to said ring timing circuit first output signal;
- a ring relay connected to said ring bus and to said subscriber loop, and said ring relay arranged to receive said first output signal from said ring timing circuit activating said ring relay disconnecting said HVLI circuit from said subscriber loop; and
- a solid state switching device connected to said ring bus and arranged to receive said second output signal from said ring timing circuit, whereby, said solid state switching device is activated connecting said ring bus and said ringing signals to said subscriber loop for transmission to said subscriber instrument.

2. The ringing signal control circuit as claimed in claim 1 wherein, said ringing signal control circuit is further arranged to disconnect said ringing signal bus from said subscriber loop, and said HVLI circuit includes means for sensing that said subscriber instrument has gone "off-hook" and that a ring trip has occurred, said HVLI transmitting a ring trip signal to said ring timing circuit, whereby, said ring timing circuit turns-off said second output signal deactivating said solid state switching device, disconnecting said ring bus from said subscriber loop, and at a specific time period subsequent to turning-off said second output signal said ring timing circuit turns-off said first output signal, deactivating said ring relay and reconnecting said HVLI circuit to said subscriber loop.

3. The ringing signal control circuit as claimed in claim 2 wherein, said central controller transmits to said logic interface circuit a ringing deactivation signal and said ringing register receives said ringing signal deactivation signal and outputs to said ring timing circuit a ring termination signal, whereby, said ring timing circuit turns-off said second output signal deactivating said solid state switching device and disconnecting said ring bus from said subscriber loop, and simultaneously, said second output signal is turned off, deactivating said ring relay and reconnecting said HVLI to said subscriber loop.

4. The ringing signal control circuit as claimed in claim 3 wherein, said ring timing circuit comprises:
- a ring register latch connected to said ringing register arranged to receive and store said ringing activation signal and output a ring register latch first output signal and a ring register latch second output signal;
- a relay register connected to said ring register latch said relay register receiving said ring register latch first output signal and transmitting sad ring timing circuit first output signal to said ring relay, activating said ring relay;
- an off-counter connected to said ring register latch arranged to receive said ring register latch second output signal and to remain in an idle state;
- an on-counter connected to said ring register latch arranged to receive said ring register latch first output signal and in response to said ring register latch first output signal to begin counting for a specific period, and to output an on-counter count completion signal when said count has been completed; and
- a solid state switching device register connected to said on-counter receiving said on-counter count completion signal, whereby, said solid state switching device register outputs said ring timing circuit second output signal to said solid state switching device, thereby, activating said solid state switching device.

5. The ringing signal control circuit as claimed in claim 4 wherein, said ring timing circuit further comprises:
- a ring trip latch arranged to receive and store said ring trip signal and output a ring trip latch first output signal and a ring trip latch second output signal;
- said relay register connected to said ring trip latch arranged to receive said ring trip latch second output signal clearing said relay register and turning-off said ring timing circuit first output signal to said ring relay, thereby, deactivating said ring relay;
- said on-counter connected to said ring trip latch and arranged to receive said ring trip latch second output signal and to remain in an idle state;
- said off-counter connected to said ring trip latch arranged to receive said ring trip latch first output signal, and in response to said ring trip latch first output signal to begin counting for a specific period, said off counter transmitting an off-counter count completion signal when said count has been completed; and
- said solid state switching device register connected to said off-counter arranged to receive said off-counter count completion signal, whereby, said off-counter count completion signal clears said solid state switching device register, thereby, turning-off said ring timing circuit second output signal and deactivating said solid state switching device.

6. The ringing signal control circuit as claimed in claim 4 wherein, said specific period is 20 milliseconds during which said on-counter advances to a count of 5.

7. The ringing signal control circuit as claimed in claim 5 wherein, said specific period is 40 milliseconds during which said off-counter advances to a count of 10.

8. The ringing signal control circuit as claimed in claim 5 wherein, said solid state switching device comprises an optical coupler and a triac device connected to said optical coupler, said optical coupler arranged to receive said ring timing circuit second output signal, turning on said optical coupler and gating said triac to connect said ring bus to said subscriber loop.

9. A ringing signal control circuit for use in a telephone system which includes a central controller operated to provide ringing connection signals at selected times, a subscriber line interface circuit (SLIC), a ringing generator operated to provide ringing signals, a ringing signal bus connected to said ringing generator, a subscriber loop, and a subscriber instrument connected to said subscriber loop, said SLIC including said ringing signal control circuit and a High Voltage Line Interface Circuit (HVLI) connected to said subscriber loop, said ringing signal control circuit comprising;

interface means connected via an address/data bus to a central controller, said interface means arranged to receive ringing connection signals from said central controller;

register means connected to said interface means arranged to capture and store said ringing connection signals and generate a ringing activation signal;

timing means connected to said register means, said timing means receiving said ringing activation signal and generating a first output signal and a second output signal, sad second output signal transmitted from said timing means at a specific time interval subsequent to said first output signal;

first switching means connected to said ring bus and to said subscriber loop, and said first switching means arranged to receive said first output signal from said timing means activating said first switching means, disconnecting said HVLI circuit from said subscriber loop; and second switching means connected to said ring bus and arranged to receive said second output signal from said timing means, whereby, said second switching means is activated connecting said ring bus and said ringing signals to said subscriber loop for transmission to said subscriber instrument.

10. The ringing signal control circuit as claimed in claim 9 wherein, said ringing signal control circuit is further arranged to disconnect said ringing signal bus from said subscriber loop, and said HVLI circuit including means for sensing that said subscriber instrument has gone "off-hook", said HVLI circuit transmitting a ring trip signal to said timing means, whereby, said timing means turns-off said second output signal deactivating said second switching means and disconnecting said ring bus from said subscriber loop, and at a specific time period subsequent to turning-off said second output signal said timing means turns-off said first output signal, deactivating said first switching means and re-connecting said HVLI to said subscriber loop.

11. A ringing signal control circuit for use in a telephone system which includes a central controller operated to provide ringing connection signals at selected times, a subscriber line interface circuit (SLIC), a ringing generator operated to provide ringing signals, a ringing signal bus connected to said ringing generator, a subscriber loop, and a subscriber instrument connected to said subscriber loop, said SLIC including said ringing signal control circuit and a High Voltage Line Interface Circuit (HVLI) connected to said subscriber loop, said ringing signal control circuit comprising;

means connected via an address/data bus to a central controller arranged to receive ringing connection signals from said central controller and to generate a ringing activation signal;

timing means receiving said ringing activation signal and generating a first output signal and a second output signal, said second output signal transmitted from said timing means at a specific time interval subsequent to said first output signal;

first switching means arranged to receive said first output signal from said timing means, disconnecting said HVLI from said subscriber loop; and second switching means arranged to receive said second output signal from said timing means, connecting said ring bus and said ringing signals to said subscriber loop for transmission to said subscriber instrument.

* * * * *